United States Patent [19]

Christian et al.

[11] Patent Number: 4,761,909

[45] Date of Patent: Aug. 9, 1988

[54] ICE HOLE FISHING PLUG

[76] Inventors: Gregory A. Christian, 8125 Vincent Ave. S., Minneapolis, Minn. 55431; Patrick L. Gray, 8940 - 16th Cir., Bloomington, Minn. 55420; Brian S. Gray, 2140 Carnelian La., Eagan, Minn. 55122

[21] Appl. No.: 59,640

[22] Filed: Jun. 8, 1987

Related U.S. Application Data

[63] Continuation-in-part of Ser. No. 916,889, Oct. 8, 1986, abandoned.

[51] Int. Cl.$^4$ ............................................. A01K 00/00
[52] U.S. Cl. ............................................. 43/4; 43/4.5
[58] Field of Search ............................ 43/4, 17, 4.5

[56] References Cited

U.S. PATENT DOCUMENTS

| | | | |
|---|---|---|---|
| 2,838,196 | 6/1958 | Chapman | 43/4 |
| 3,555,827 | 1/1971 | Herr | 43/4 |
| 3,999,322 | 12/1976 | Kooker | 43/4 |

FOREIGN PATENT DOCUMENTS 1074584  4/1980  Canada ..................................... 43/4

Primary Examiner—Nicholas P. Godici
Assistant Examiner—Karen Skillman
Attorney, Agent, or Firm—Warren A. Sturm

[57] ABSTRACT

A hollow, elongated tubular member, constructed of flexible resilient material and including an inlet-outlet for admitting and discharging fluid under pressure, is adapted to be disposed in a hole in a layer of ice so that the top and bottom ends extend upwardly and downwardly above and below the layer of ice such that, when inflated, the top and bottom ends expand to seal the hole and to retain the hollow tubular member as an easily removable plug to displace water within the hole and thereby prevent reformation of the ice therein. The method of temporarily plugging a hole in a layer of ice includes the steps of providing an elongated, resilient inflatable tube, inserting the tub partially through the ice hole and inflating the tube to expand the top and bottom so as to retain the tube in the hole.

7 Claims, 2 Drawing Sheets

ICE HOLE FISHING PLUG

This is a continuation-in-part of our copending application Ser. No. 916,889 filed Oct. 8, 1986 now abandoned for ICE HOLE FISHING PLUG.

BACKGROUND OF THE INVENTION

1. Field of the Invention

This invention relates to fishing aids and is more particularly directed to a hole-saver and method for preventing the formation of ice in a previously drilled ice hole during periods when the hole is left unattended and the ambient temperature is conducive to the reformation of ice within the confines of a hole.

2. Prior Art

The following is a list of prior art noted in the course of a preliminary patentability search:

| Patent No. | Issued | Title | Patentee |
|---|---|---|---|
| 2,877,595 | 3/17/59 | Ice Fisherman's Angling Hole Plug | Steuart |
| 2,901,855 | 9/01/59 | Fishing Device | Todd |
| 3,134,188 | 5/26/64 | Insulated Ice Fishing Pad | Petersen |
| 3,230,655 | 1/25/66 | Fishing Device | Nomsen |
| 3,578,748 | 5/18/71 | Ice Fishing Hole Cover | Hurd |
| 3,813,891 | 6/04/74 | Method and Apparatus for Retarding Ice Formation in an Ice Fishing Hole | Wooten |
| 3,984,935 | 10/12/76 | Chamber Ice Fishing Pole | Peterson, Jr. |
| 4,253,262 | 3/3/81 | Ice Fishing Tipup | Johnson |

From a consideration of the patents noted above, it may be seen that U.S. Pat. No. 3,813,891 shows a foamed insulating structure that is inserted into an ice hole and contains internal removable structure for obtaining access to the ice hole while retarding heat transfer; U.S. Pat. No. 4,253,262 shows a heated bowl that is disposed in an ice hole and relies upon a source of heat within the bowl to prevent the reformation of the ice layer; U.S. Pat. No. 3,134,188 shows an insulated pad; U.S. Pat. No. 3,578,748 shows an insulated pad having a black coating and using an adhesive grease-like substance for a release agent from ice that may be formed; and U.S. Pat. No. 2,877,595 shows a tapered plug that is adapted to receive a source of heat for releasing from an ice hole.

None of the above noted prior art, nor any of which applicants are presently aware, illustrates the novel and unobvious invention as will be set forth below.

BRIEF DESCRIPTION OF THE INVENTION

Our method and apparatus for preserving holes in a layer of ice for ice fishing during periods of non-use, comprises providing an elongated flexible and resilient structure that is hollow and will expand when filled with a fluid, such as air, under pressure to fill the hole. To facilitate ease of operation, the structure is provided so that the top and bottom ends, when in position in a hole in a layer of ice, extend above and below the top and bottom portions of the layer of ice and, when inflated, the top and bottom ends will expand over the layer of ice and retain the plug in operative position. Our structure is also provided with a means at its lower end to receive a weight of suitable mass to overcome the flotation of the device and which may be used for receiving and retaining live bait when disposed in the water underneath the layer of ice.

A further embodiment of our invention utilizes a method and apparatus which provide for greater expansion at an end that is disposed beneath a layer of ice than is attained at the end that is disposed above a layer of ice and in which both ends are expanded in response to fluid under pressure to overlie the top and bottom ends of a hole extending through the a layer of ice. In this further illustrated embodiment, the relatively stiffer top portion of our plug facilitates insertion of a deflated plug into a hole as well as to provide an improved engagement with the top and bottom of the hole through a layer of ice and results in a method and apparatus that is possessed of increased reliability and efficiency as well as longer life.

It is therefore an object of our invention to provide an improved ice hole plug.

Another object of our invention is to provide an improved method of preserving an ice hole during periods of non-use.

A still-further object of our invention is to provide an inflatable, removable ice hole plug that is easily inserted and removed.

It is a still further object of our invention to provide a durable, reuseable ice hole plug that may be economically fabricated of readily available material.

These and other objects of our invention will become apparent from a consideration of the appended specification, claims and drawings in which;

Figure 1:
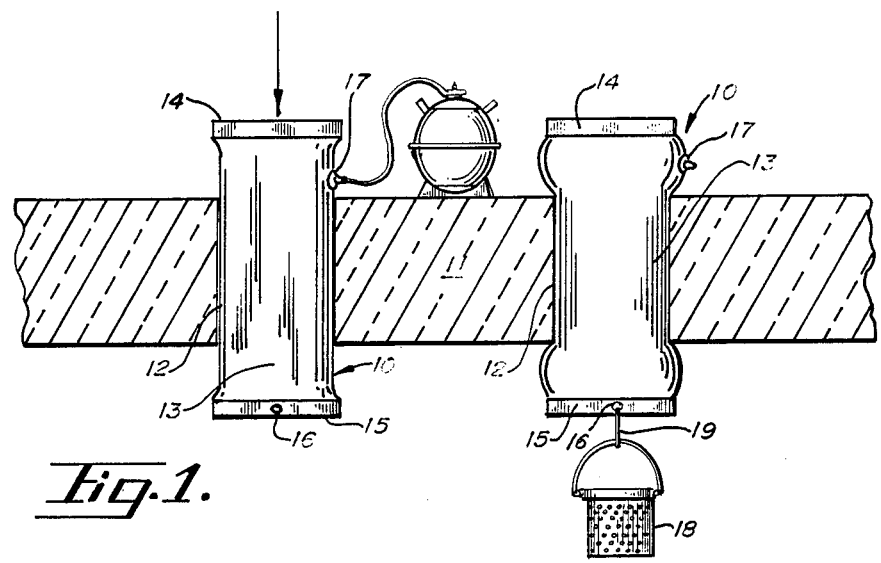
FIG. 1 is a side elevational view of a sheet of ice having a pair of holes illustrating a preferred embodiment of our invention in two states of operation.
Figures 2, 3, 4, 5:
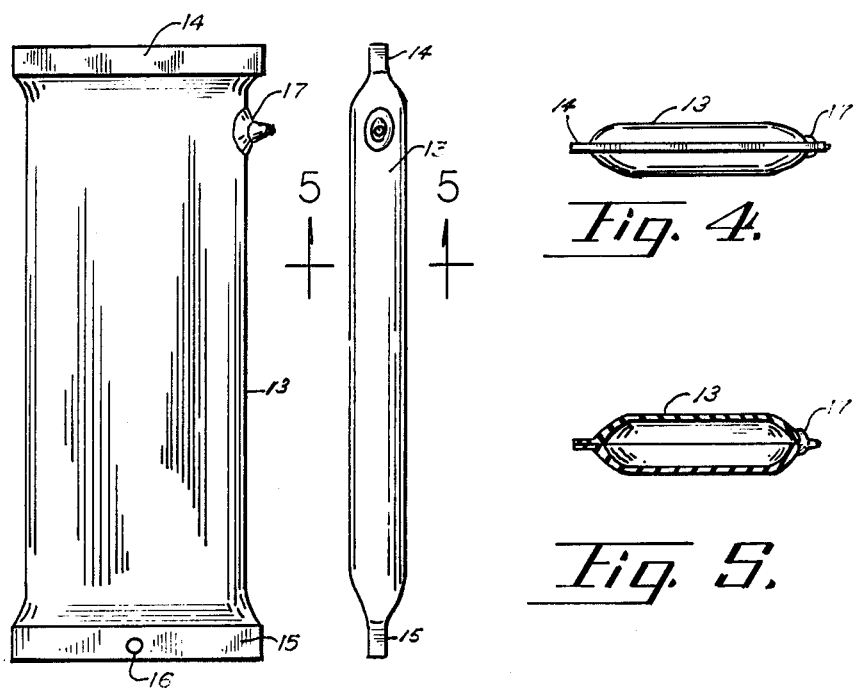
FIG. 2 is an enlarged front elevational view of the preferred embodiment of FIG. 1.
FIG. 3 is a side elevational view of the apparatus of FIG. 2.
FIG. 4 is a top plan view of the apparatus of FIGS. 2 and 3.
FIG. 5 is a sectional view taken along section lines 5—5 on FIG. 3.

Referring now to the drawings, our ice hole plug is indicated generally by reference character 10 and is shown, in FIG. 1, disposed in a hole 12 in a layer of ice indicated by reference character 11.

Plug 10 is comprised of a hollow elongated tube 13 having a top 14 and bottom 15 and a valve assembly 17 for admitting and releasing fluid under pressure. An aperture 16 is provided in bottom 15 for receiving a line 19 that may be used for supporting a bucket 18 for receiving and retaining live bait.

Plug 10 may be fabricated of materials exhibiting flexibility and resiliency characteristics so that tube 13 will expand beyond its normal shape when fluid under pressure, such as air or a liquid having a low freezing point, is introduced through valve assembly 17. In one embodiment of our invention, a tube of the rubber utilized in, for example, inner tubes for automobile tires, was provided of a predetermined length and sealed at the top and bottom ends 14 and 15 and valve assembly 17 attached to an aperture by suitable adhesive means.

Figure 6:
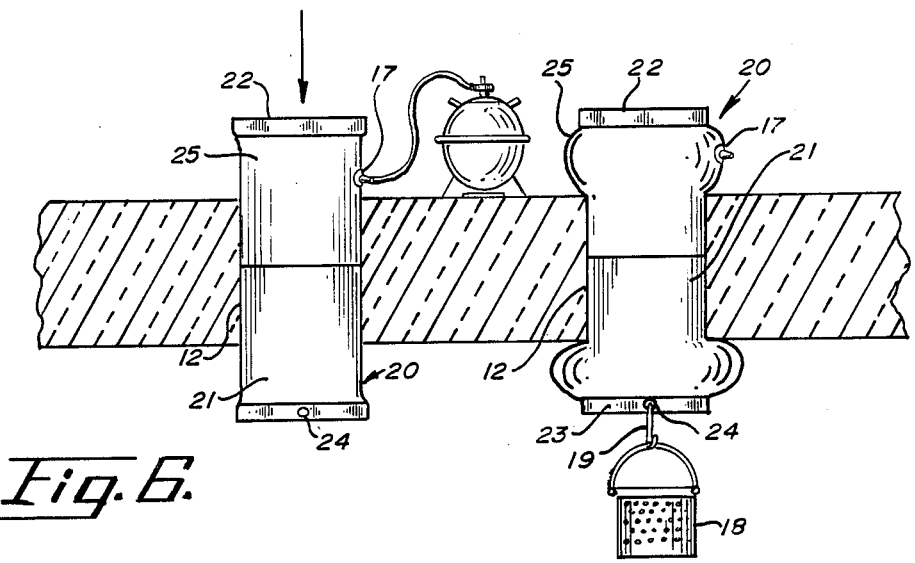
FIG. 6 is a side elevational view of sheet of ice having a pair of fishing holes and illustrating a further embodiment of our invention in two states of operation.
Figures 7, 8:
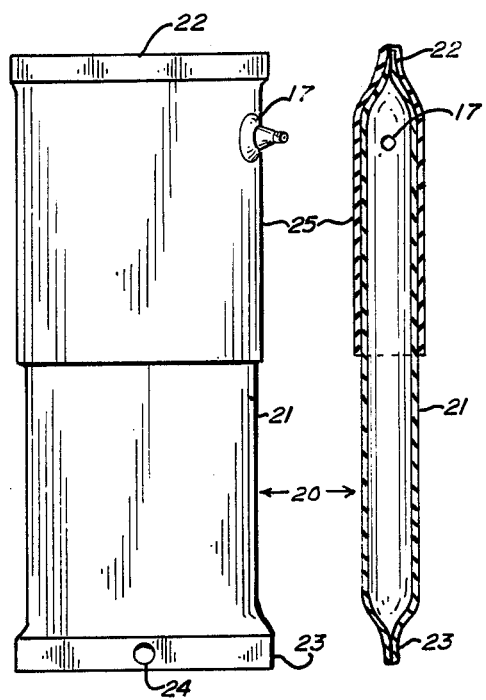
FIG. 7 is an enlarged front elevational view of the embodiment of FIG. 6.
FIG. 8 is a side elevational view taken along section line 8—8 on FIG. 7 of the drawings.

Referring to FIGS. 6, 7 and 8 of the drawings, a further embodiment is illustrated and indicated generally by reference character 20 as a plug comprised of an inner tube portion 21 having a top end 22 and a bottom end 23 and an outer sleeve 25 disposed over the top end of inner tube 21. Bottom end 23 is provided with a hole 24 for connection to, for example, a bait bucket 18 suspended from hole 24 through suitable fastening means 19. An inflation valve 17, for admitting fluid under pressure, is disposed adjacent top end 22 and extends through outer sleeve 25 and inner tube 21 to effect communication with the interior of plug 20.

Plug 20 is shown in two states of operation in FIG. 6 of the drawings as extending through holes 12 disposed in a layer of ice 11.

In the embodiment of FIGS. 6, 7 and 8, approximately the top half of plug 20 is comprised of elastic, resilient material that exhibits a lesser elastic characteristic so that filling the interior of tube 20 with fluid under pressure will result in a greater expansion of the lower end of inner tube 21 (or plug 20) that is attained at the upper end of tube 21 (or plug 20) that is rendered thicker and less elastic by the overlying outer sleeve 25. The relative expansions of the top and bottom of plug 20 illustrated at the right end of FIG. 6 are indicative of the method and condition of the apparatus in a typical use environment. We have found that a plug up to 48 inches in length is suitable for ice layer thicknesses up to 36 inches.

It may also be noted that the upper portion of plug 20 may be fabricated out of dissimilar material from the bottom portion and/or homogeneous material wherein the upper section is thicker than the bottom section. In any event, the lesser elasticity and resilience results in the upper portion of plug 20 exhibiting a relative degree of stiffness so as to provide for easier insertion of the plug into a hole in a layer of ice.

OPERATION

Our plug, 10, is typically fabricated so that in a deflated state, the longitudinal length is greater than the thickness of an ice layer and the cross sectional shape is less than the diameter of an ice hole to be preserved with the plug. As shown in the left portion of FIG. 1, plug 10 is inserted into an ice hole 12 so that top and bottom ends 14 and 15 are disposed approximately the same distance from the top and bottom of a layer of ice 11. Valve 17 is attached to a tank of compressed air or a hand pump and plug 10 is inflated to assume the shape shown at the right side of FIG. 1 such that the portions of tube 13 adjacent top and bottom ends 14 and 15 expand so that the cross section is larger than the diameter of hole 12 and plug 10 is thereby retained in position until the air or fluid under pressure, is released from the interior at which time plug 10 may easily be withdrawn from hole 12 leaving the hole in its original size and shape.

The operation of the embodiment of plug 20 is similar insofar as inflation thereof results in expansion of the top and bottom ends into engagement with the ice layer adjacent the top and bottom ends of a hole, 12, in ice layer 11. There is, however, a decided difference in the greater amount of expansion exhibited at the bottom end 23 and distinguished from the top end 22 as illustrated at the right portion of FIG. 6. The expansions effected at the top and bottom are such as to engage the bottom and top surfaces of ice layer 11 regardless of the thickness of the layer. The effect of hydrostatic pressure on the bottom of tube 20 is substantially eliminated by virtue of the greater elasticity or resiliency of the material of the lower half of tube 20. The lesser degree of resiliency or elasticity on the top half provides a longitudinal stiffness.

While a bait bucket 18 is shown attached to lower end 15, it is anticipated that a weight of suitable mass to overcome the buoyancy of plug 10 may be substituted and/or the bait bucket possess the characteristics of providing sufficient weight to render the assemblage to present a neutral buoyancy when in a deflated state.

I claim:

1. An icehole plug, comprising, in combination: a hollow, longitudinally elongated member comprised of material exhibiting resiliency characteristics permitting the walls of said member to expand when unrestrained, said member further having an upper portion comprised of material exhibiting a lesser degree of resiliency than the material of the bottom portion and including means for receiving and discharging fluid under pressure to and from the interior thereof and adapted to be disposed in a hole to be plugged so that the top and bottom portions remain unrestrained when fluid under pressure is admitted to the interior thereof whereby the ends of said member will expand over the ends of a hole.

2. The subject matter of claim 1 in which the fluid under pressure is a gas.

3. The subject matter of claim 1 in which the elongated member is fabricated of rubber.

4. The subject matter of claim 1 in which the lower end of the elongated member includes means for supporting a weight.

5. The subject matter of claim 4 in which the weight includes means for receiving live bait.

6. An icehole plug as in any one of claims 2, 3, 4, 5 or 1 in which the elongated member is of tubular configuration.

7. The method of temporarily plugging an ice hole comprising the steps of: providing a hollow and elongated tubular member comprised of flexible resilient material and of a length greater than the thickness of a layer of ice and in which the bottom end of the tubular member is comprised of material exhibiting a greater degree of flexibility than the material of the top end of said elongated tubular member; inserting said tubular member through a hole in said layer of ice; and introducing fluid under pressure into said tubular member so that the top and bottom ends expand to extend over and about the top and bottom ends of the hole in the ice.

8. The method of claim 7 including the step of attaching a weight to the bottom of the tubular member before insertion into the ice hole.

* * * * *